United States Patent Office 3,519,925
Patented July 7, 1970

3,519,925
METHODS OF AND APPARATUS FOR THE CORRELATION OF TIME VARIABLES AND FOR THE FILTERING, ANALYSIS AND SYNTHESIS OF WAVEFORMS
Nigel Allister Anstey, Chelsfield, Kent, and William Edward Lerwill, Keston, Kent, England, assignors, by mesne assignments, to Seismograph Service Corporation, Tulsa, Okla., a corporation of Delaware
Filed Nov. 6, 1962, Ser. No. 235,622
Claims priority, application Great Britain, Nov. 8, 1961, 40,018/61
Int. Cl. G01r 23/16; G06f 15/34; G06g 7/19
U.S. Cl. 324—77                    14 Claims This invention relates to methods of and apparatus for the correlation, particularly cross-correlation, of time variables and for the synthesis of waveforms. It is especially, but not exclusively, concerned with and it will be described with particular reference to methods of and apparatus for the automatic recognition or analysis of speech-frequency waveforms, and for the synthesis of speech although it should be understood that the invention includes a number of features which are applicable to other purposes and some of which are not limited in their uses to cross-correlation nor to speech frequencies.

It is one of the objects of the present invention to provide novel and improved methods of and apparatus for use in correlation, including particularly but not exclusively the cross-correlation of time variables.

Another object of the invention is the provision of methods of and apparatus for use in the recognition or analysis of waveforms, including especially but not exclusively those of speech frequencies.

Another object of the invention is to provide improvements in methods and apparatus for use in the synthesis of waveforms, including speech waveforms.

A still further object of the invention is the provision of methods of and apparatus for use in spectrum analysis, while yet another object is to provide improvements in methods of and apparatus for filtering waveforms.

A still further object of the invention is to provide a novel method of and apparatus for filtering by the use of which a filter pass-band can be provided the form of which can easily be controlled within side limits, while it can be designed to have a flat top and extremely steep sides.

Another object of the invention is to provide means for improving the intelligibility of speech and of other signals and of reducing the effect of background noise.

A still further object is to provide improved methods of and apparatus for effecting recording, particularly magnetic recording, and playback at high speeds.

Further objects and advantages of the present invention will become apparent from the following description.

In describing the invention and some of its applications reference will be made to the accompanying drawings, which are given by way of illustration and example and in which:

FIG. 2b shows, also somewhat diagrammatically and in perspective and partly broken-away, the assembly of a drum with a sheet or strip carrying magnetic tracks, the drum being designed for rotation within the head unit shown in FIG. 2a;

FIG. 2c is an end view, certain parts being omitted, showing the drum (with its tape) of FIG. 2b rotating within the head unit of FIG. 2a;

FIG. 3b is a plan view showing the lower part of the apparatus of FIG. 3a;

FIG. 6b is a plan view, partly broken-away, showing the apparatus of FIG. 6a;

In science and industry there often arises a need to recognise or identify a particular waveform (or a series which may be represented as a waveform). If the waveform is of long duration or is complicated in nature, it is known that the most satisfactory method of identifying it is by means of correlation techniques. It is also known that these techniques allow the identification of such waveforms when the latter are immersed in a very considerable level of incoherent background noise.

A correlation technique for the identification of a particular waveform $g(t)$ in a signal $r(t)$, the latter including both the waveform $g(t)$ and superimposed noise, typically involves the evaluation of the cross-correlation function $\phi_{gr}(\tau)$, where $$\phi_{gr}(\tau) = \frac{1}{T} \int_0^T g(t+\tau) r(t) dt$$

and where T is the duration of the waveform $g(t)$. The cross-correlation is a function of $\tau$, the shift between the two signals, and rises to a maximum identifying the waveform $g(t)$ for that value of $\tau$ for which the coherence between the two signals $g(t)$ and $r(t)$ is a maximum.

The present applicants have invented a novel method of and apparatus for correlating two functions, which invention formed the subject of U.S. patent application No. 190,912, filed on Apr. 30, 1962. Further developments and applications of the invention and apparatus for carrying it out, all devised by the same inventors, are described in U.S. application No. 192,669, filed May 7, 1962.

In application No. 192,669, particular apparatus embodying the original inventive idea and its principles is described which is adapted to a frequency range of a few cycles per second to a few hundred cycles per second (i.e. the frequency range employed in seismic exploration). The present invention provides novel and improved correlating apparatus which is particularly well adapted to a frequency range up to a few kilocycles per second. This frequency range is sufficient to include many commonly-encountered accoustic waveforms (airborne, water-borne and structure-borne), and in particular to include the waveforms of speech.

In a form which may serve as a basis for consideration of the present invention a correlator of the kind described in U.S. application No. 190,912 is arranged as follows:

A standard (e.g. ¼ inch wide) magnetic tape is caused to move past a conventional recording head at a conventional speed (e.g. 3.75 in./sec.), using any suitable method of tape transport. One of the two signals to be cross-correlated is recorded on the magnetic tape by the recording head, so that this signal is recorded in the form of variations in intensity of magnetisation as a function of distance along the tape. The tape then passes over the playback head. This head may be made by the following method. It is made prior to the cross-correlation, utilising the other of the two signals to be cross-correlated.

According to this method, which is one of the several methods which may be used in the production of the playback head, this second one of the two signals to be cross-correlated is first recorded on paper or film as a wiggly or line trace, which may be done using a galvanometric oscillograph, for example. The recording is effected with a maximum amplitude which is slightly less than the width of the magnetic tape and with a time scale which is, in this case, identical to the speed of the tape. This trace is then transformed (for instance by photographic and etching processes well known in the printed circuit art) into a thin conducting line (having the configuration of the waveform) which is supported on or bonded to a suitable insulating base material (e.g. fibreglass). The arrangement with the electrically conducting track provides the playback head and it is illustrated diagrammatically and by way of example, in FIG. 1 of the accompanying drawings.

Figure 1:
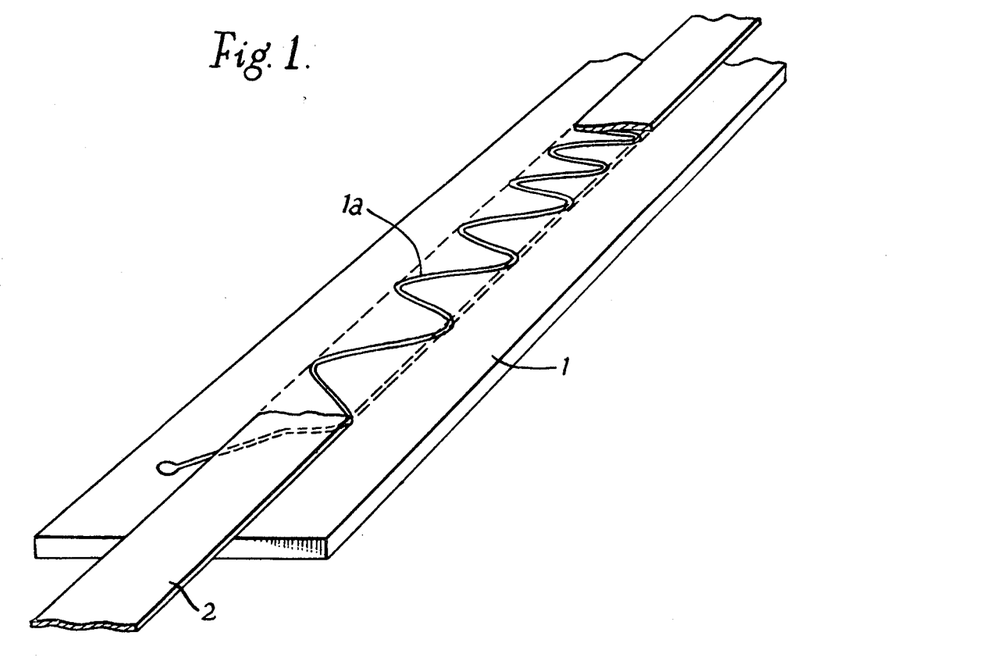
FIG. 1 shows diagrammatically a play-back head over which a magnetic tape is travelling.

This figure shows part of a playback head 1 having a conducting strip 1a over which a magnetically recorded tape 2 is caused to travel by any suitable means (not shown).

The voltage appearing between the ends of the conducting strip 1a as the tape 2 passes over it is a measure of the cross-correlation of the signal recorded on the tape with that represented by the waveform of the strip 1a on the playback head, except for modification by the normal processes of magnetic induction. The latter effects can be compensated, and the true cross-correlation obtained, by a double integration applied before or after (or partly before and partly after) the playback process.

A correlator head can be produced by the method described above which is suitable for seismic exploration, as described in the aforesaid application No. 192,669, where the frequency range is approximately 10 to 150 c.p.s. and the duration of the signals to be cross-correlated is of the order of several seconds.

For speech-frequency waveforms the range extends up to about 500 c.p.s., or more, and the interest is normally in signal durations of less than half a second. At the present time the fineness limitations of printed-circuit technique require that for a frequency response to 5000 c.p.s. the tape speed must be of the order of 100 inches per second. One feature of the apparatus which will be described below and of the present invention is that by the use thereof this type speed can be provided in a convenient manner. A second feature of the apparatus and present invention is that a number of printed heads can be arranged so that cross-correlation of one or more signals against many printed waveforms may take place simultaneously.

Figure 2A:
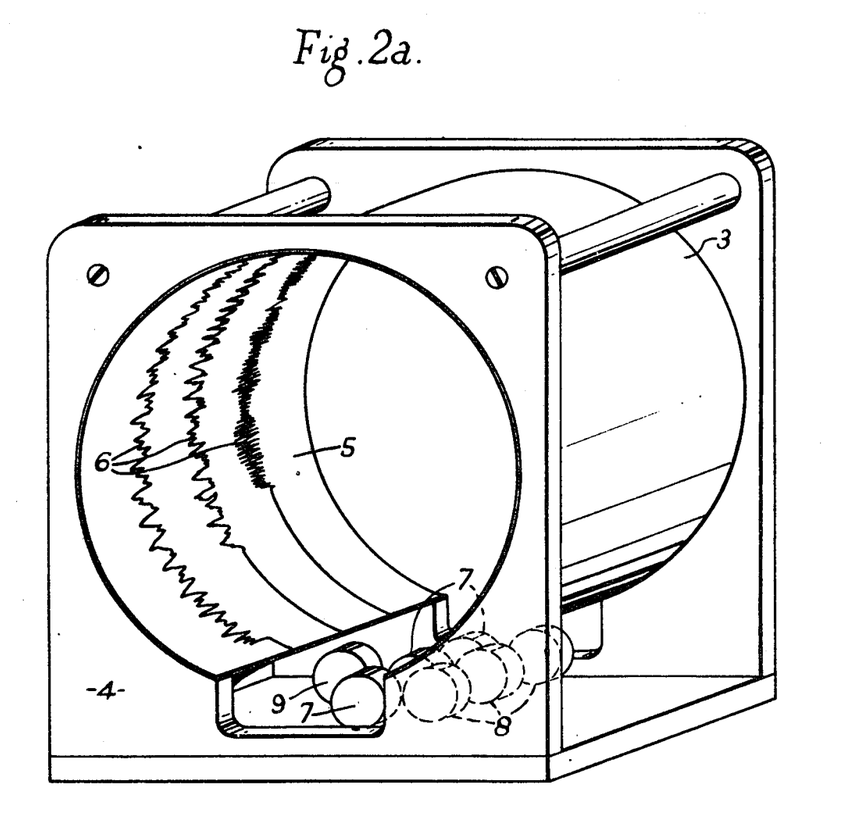
FIG. 2a is a perspective view which shows, somewhat diagrammatically and with some parts omitted, part of a unit which includes a number of play-back heads and which exemplifies certain features of the invention.

Referring again to the accompanying drawings, FIG. 2a shows a hollow open-ended tube 3 which is supported in a suitable frame 4. Typically, the tube might be 14 inches in diameter and 21 inches long. To the inner surface of this tube is attached a flexible printed-circuit board 5 bearing printed conducting playback strips or tracks 6. Any number of these tracks 6 may be provided; the dimensions quoted allow for any number up to about 40. Three such printed tracks are shown in FIG. 2a. Before insertion in the tube 3 this board 5 is about 40 inches long and 21 inches wide; the printed tracks 6 are each a maximum of ¼ inch wide, and they also have a separation of about ¼ inch. Electrical connections (not shown) are brought out from the ends of the tracks 6 in any suitable manner.

The two ends of the board 5 do not meet when the latter is inserted into the tube 1, but a space of about 5 inches is left, in which there are mounted recording heads 7 and erase heads 8, one for each of the tracks 6. These heads are mounted so that their gaps and the printed playback tracks 6 lie in the same cylindrical surface. The record and erase heads may be conventional quarter-inch components. One or more conventional playback heads 9 may also be fitted, if desired, for monitoring purposes.

Figure 2B:
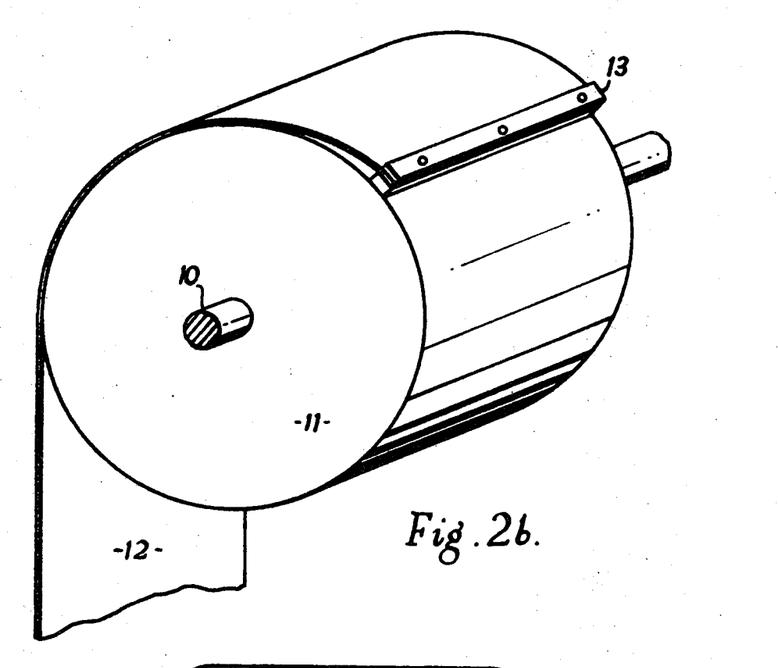

Inside the tube 3, and concentric with it, there is mounted a shaft 10 bearing a drum 11 (FIG. 2b). The drum 11 may typically be 13 inches in diameter and 20 inches long, so that it rotates with about ½ inch clearance inside the tube 3. The drum 11 is caused to rotate by a suitable geared motor (not shown) at a rotational speed which may typically be 133 r.p.m.

Figure 2C:
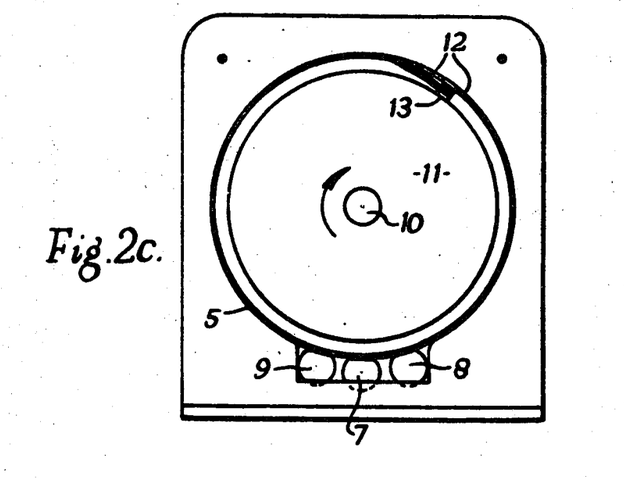

A sheet 12 of conventional oxide-coated synthetic plastic material, which in this particular example may be 47 inches long and 20 inches wide, is attached at one of its ends to the drum 11 along the line 13. Its other end overlaps the line 13, as shown in FIG. 2c. As the drum 11 spins, centrifugal action forces the tape material 12 away from the drum and into contact with the printed playback tracks 6, the recording heads 7, the erase heads 8 and any playback heads 9 which are fitted. The thickness and density of the backing material of the tape 12 are as chosen that the pressure of the tape on the recording tracks 6 is adequate for satisfactory recording, but is not excessive. If necessary an additional backing, formed for example of a rubber sheet, may be provided to increase the pressure. The effective tape speed under the conditions quoted is 100 in./sec. FIG. 2c shows in side elevation the drum 11 and tape 12 revolving inside the tube 5.

The method described of using centrifugal force to keep a magnetic recording tape in contact with a head or heads, particularly when the latter are of some length, as exemplified by the tracks 6, itself forms an important feature of the present invention. It is capable of other applications, besides that described.

In a simple way of using the apparatus shown in FIGS. 2a to 2c, the incoming sound signals are first amplified and then applied individually, with suitable bias currents, to all the recording heads 7 identically. All the printed playback tracks 6 therefore see the same pattern of magnetisation on the tape 5, but in general on only one playback track does the pattern of magnetisation so match the pattern of the track that most or all the voltages induced in the elements of length of the track add to give a large voltage output. This method of using the device is applicable when the incoming signal is believed to contain one or more of the reference waveforms, and it is desired to know which ones these are. Alternatively, the recording heads 7 may each be energised with different signals, the printed tracks 6 being identical; the machine then operates to identify which recorded signal includes the reference waveform. Alternatively again, the tracks 6 may be different, so that the machine functions as a multichannel correlator.

Referring to FIGS. 2a to 2c, the printed board 5 may be mounted inside the tube by means of releasable catches (not shown) which will ensure positive location of the printed tracks 6 in line with the recording heads 7 and which will also allow rapid changing of the board when it finally becomes worn. To minimise wear, "sandwich" type tape may be used, that is tape which has a very thin layer of plastic material overlying the oxide film. Alternatively, the magnetic material of the tape may actually be a thin metal sheet; in this case the printed board must be covered with suitable insulating material (e.g. a polystyrene or other suitable synthetic plastic, a suitable material being the adhesive tape which is sold under the trademark "Teflon" and which may be about 0.001 or 0.002 in. thick).

It should be noted that the printed boards are inexpensive and easily changed, so that a wide variety of waveforms may be handled by a single machine.

Apart from using an endless tape or loop, other methods of using motion along a circular path to provide for a high speed of the record medium past the heads is possible, in accordance with this invention, including particularly the use of a record medium arranged in the form of a rotating disc. Such an arrangement is especially suitable for use in cases (for instance, in the correlation analysis of speech) in which some of the reference waveforms are predominant in high frequencies and others in low frequencies. In such cases the drum device of FIG. 2 may conveniently be replaced by a disc device, such as that which is shown somewhat diagrammatically in FIGS. 3a and 3b.

Figure 3A:
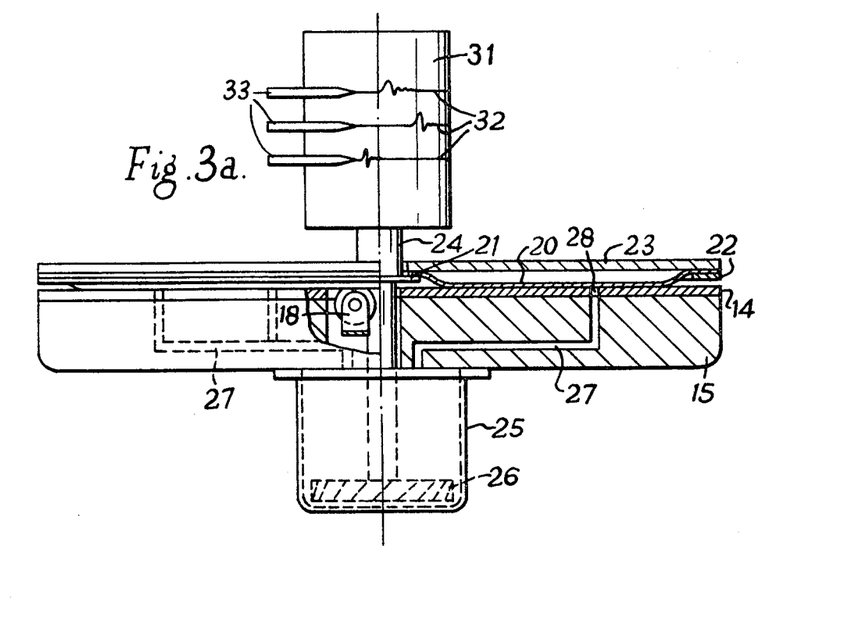
FIG. 3a is a vertical sectional view of a disc-type unit which exemplifies a number of important features of this invention.
Figure 3B:
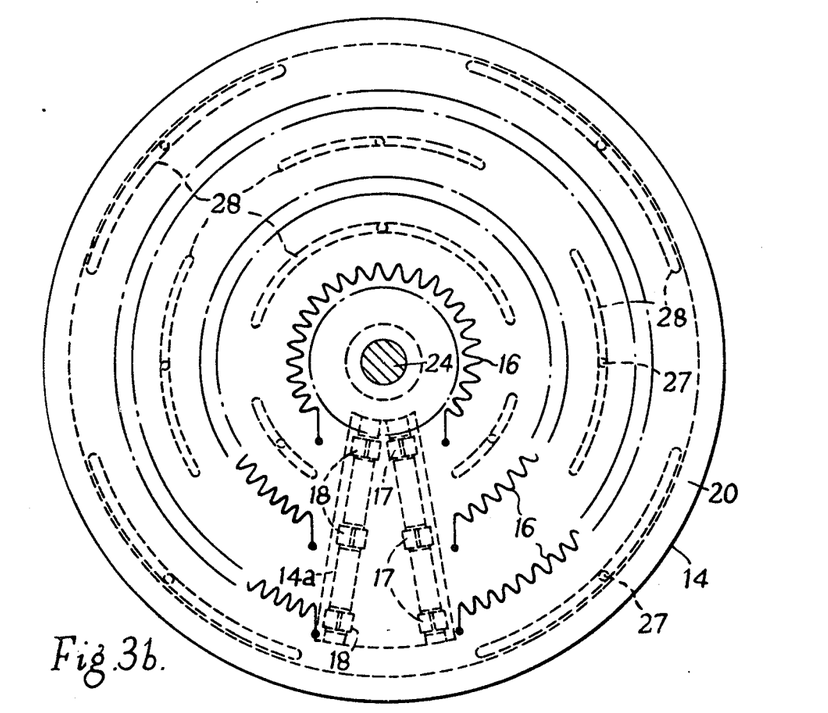

In these figures the numeral 14 represents a circular board of insulating material which takes the place of the flexible board 5 of FIG. 2a. This board 14, which is mounted on a cast, moulded or other suitable base 15, carries conducting tracks 16 analogous to the tracks 6 of FIG. 2a; these tracks 16 may be made by the printed-circuit process, as before. The higher frequency waveforms are disposed towards the edge of the board 14, the lower-frequency waveforms towards the centre. A cut-away hole 14a in the board 14 allows recording heads 17 and erase heads 18 (analogous to the heads 7 and 8 in FIG. 2a) to be mounted with their gaps flush with the plane of the conducting waveforms 16.

A disc 20 formed of an oxide-coated plastic sheet is made to revolve above the board 14 with its active face in contact with the conducting waveforms 16 and with the heads 17 and 18. This disc 20 is secured, by means of suitable clamping means indicated at 21 and 22 at its centre and edge respectively, to a circular driving member 23, which is mounted on and driven by a shaft 24 using a synchronous electric motor 25. The oxide face of the disc 20 may be maintained in contact with the heads 17 and 18 and with the conducting waveforms 16 by gravity, by an increased air pressure above the disc or by a partial vacuum below it. In the latter case a fan 26 (which may be one fitted in the motor 25 to draw cooling air between its stator and rotor) may be used to reduce the air pressure in channels 27 (which extend through the base 15 and board 14, where they terminate in openings 28). The resulting suction tends to hold the disc 20 in contact with the heads 17 and 18 and with the board 14 as it rotates.

Additional apparatus of any suitable type may be attached to or coupled with the shaft 24 for the recording or display of the results of the cross-correlation process. Such apparatus might, for example, take the form of a drum, such as the drum 31, which is shown purely diagrammatically in FIG. 3a, mounted on the shaft 24 and on which a trace or traces, such as 32, is or are drawn by one or by a number of styli 33, to which the outputs from the tracks 16 are fed, after suitable amplification. It would be possible to arrange for a single stylus to record for each track 16 in turn, or for any selected tracks, but it is convenient to provide a number of styli 33, one of each of the tracks 16.

As stated hereinbefore, the photographic masters used in the manufacture of the printed-circcit tracks or heads, such as 6 or 16, may be made, in the case of frequencies lower than a few kilocycles per second, from the trace of a galvanometric oscillograph writing on film moving at the appropriate speed. Alternatively, and for higher frequencies, the electrical signal may be used to govern the y-deflection of a suitable oscilloscope (without x-deflection); a fast-moving film in an oscilloscope camera then records this deflection at the appropriate time scale. The film drive may be of conventional type, or it may use parts of the drive systems of the correlating apparatus, e.g. the drive for the drum 11 or plate 14; this naturally provides exactly correct speeds. Alternatively again, the reference signal may be recorded (on a separate tape recorder) at one speed and played back at a lesser speed; this reduces the high-speed demand on the film and the film drive system.

Figures 4, 5:
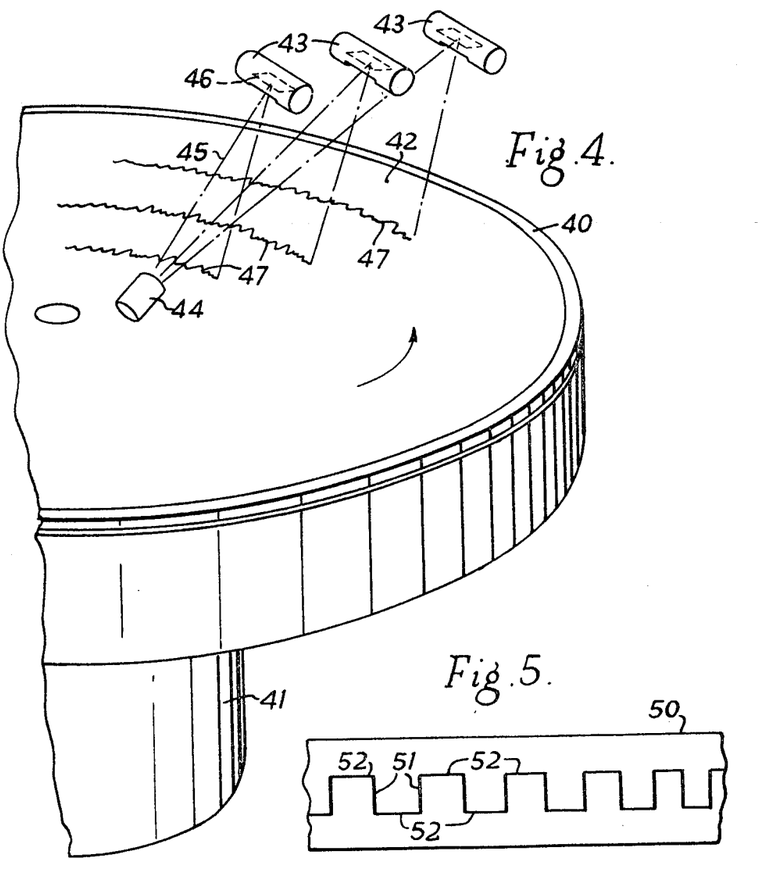
FIG. 4 is a diagrammatic perspective view illustrating a method of producing a number of tracks which form playback heads similar to those shown in FIG. 3b.
FIG. 5 is a detail view showing diagrammatically part of one type of head which may be used in carrying out the invention.

FIG. 4 shows diagrammatically one method of producing galvonometric oscillograph writing on a film in the form of a disc. In this figure the refernce 40 represents a rotating turntable or disc which may take the place of or be mounted on a driving member 23 of FIG. 3a. The disc 40 is driven by a synchronous electric motor 41 (similar to the motor 25). The disc 40 carries a sheet of photographic material which is indicated at 42.

A number of galvanometers 43, one for each track to be recorded, are mounted above the disc 40 and a light source 44 is provided, arranged to direct a beam of light, such as that indicated at 45 on to the mirror 46 of each galvanometer 43. The galvanometers are adjusted to produce a series of suitably-spaced concentric recordings 47 on the photographic material 42, when the latter is rotated by the disc 40 and when the appropriate signals are supplied to the galvanometers 43. A suitable switch or relay (not shown) may be provided to ensure that light from the source 44 reaches the galvanometers during one revolution only of the disc 40, while means are also provided to prevent stray light from reaching the photographic material 42.

Whichever method is used for producing a photographic master, the technique is adjusted to produce a waveform which may have, for the dimensions quoted previously, a maximum amplitude of about ¼ inch. The time base of this waveform may be 100 inches per second in the case of a drum-type machine; the time base varies with radial distance in the case of a disc-type machine. In the latter case the several waveforms are disposed radially so that the highest frequencies present in each waveform are capable of reproduction by the printed-circuit process.

For experimental purposes, it is sometimes sufficient (depending on the nature of the waveforms and on the purpose for which cross-correlation is desired) to record one reference waveform on one or each track of the tape sheet or disc, to remove the tape and to dust it with fine iron powder, to photograph this dusted tape (on which the zero-crossings of the recording current are identified by lines of powder), and to link on the photograph alternate ends of the powder lines with drawn lines, in the manner of a square wave.

An example of this is illustrated in FIG. 5 in which 50 indicates a part of a photographic record on which the lines of powder are represented at 51. Alternate ends of the lines 51 are joined by lines 52, drawn in ink, in order to produce the waveform shown. From this a printed head can be made which has sensitivity only at the zero-crossings of the waveform, and this is adequate for many purposes.

An automatic gain control having suitable attack and release times may be used in the recording amplifier (both for the making of the printed head and for the cross-correlation process) to keep approximately constant the levels of the signals used.

It was stated previously that two stages of integration must be performed in the system if all frequencies are to be represented correctly in the cross-correlation; one integration is necessary to offset the normal 6 db per octave rise associated with direct magnetic playback, and the other to compensate the fact that the sensitivity of an element of the printed head is proportional to the slope of that element.

Clearly several possibilities exist for the location of these equalising stages in the process, and one possibility may not be optimum for all reference waveforms. For those reference waveforms which are rich in high frequencies, one or even both stages of integration may be applied in the amplifier which is used in making the master photograph for the printed head; this is because the printed circuit process is better able to cope with the highest frequencies when they are not at full ¼ inch amplitude.

It is also true that all important frequencies must be represented at an amplitude which is significantly greater than the thickness of the printed line, and so a balance may be found depending on the frequency content of each reference waveform. That part of the necessary equalisation which is not provided in the printed head may conveniently be provided in the amplifier which follows it.

There exist four main applications for the apparatus of this invention which has been described, and further features of the apparatus and of the invention will become evident as these are considered in turn.

The first major application is in the recognition of complex waveforms. These waveforms may represent air-borne, water-borne or structure-borne sounds, of natural, animal, musical or industrial origin, and the purpose in identifying them may range from secure communications and echo-ranging to the provision of warning signals indicating the malfunction of an industrial machine. Alternatively, the waveforms may be time functions representing particular patterns, or the functions resulting from the scanning of such patterns; the purpose in identifying these may range from numerical and industrial sorting to the classification and recognition of fingerprints.

For these applications, the choice between the drum and disc correlators depends mainly on the number and duration of the waveforms to be recognized, and on their frequency content, as explained hereinbefore.

The type of output delivered by the correlators depends, of course, on the nature of the reference and signal waveforms; if the reference waveform is non-repetitive and the signal input includes this waveform in a background of noise, the output will be a sharp pulse when the waveform is recognised, and the noise level will be relatively attenuated. If the reference waveform is repetitive and the signal input includes this waveform in a background of noise, the output will be a periodic waveform whose amplitude rises steadily to a maximum and then falls; again, wide-band noise will be relatively attenuated. The longer the duration of the reference waveform, the better is the attenuation of the noise and the more positive is the identification of the waveform. However, the longer the duration of the reference waveform, the more precisely must the time scale of the reference waveform match that of its counterpart in the input signal.

These features recur continually in correlation techniques. Long signals give the best signal-to-noise ratio at the correlator output, but short signals must be used if there is any doubt concerning the identity of the time scales of the reference waveform and its counterpart in the input signal. This point is also illustrated in the second application of the apparatus of this invention.

The second major application of the invention is to the use of the correlator as a spectrum analyser. The present invention provides apparatus which is particularly well suited for spectrum analysis covering frequencies which extend well up in and in fact beyond the range of audio frequencies. The magnetic apparatus which was described in our aforesaid U.S. application was, on the other hand, designed principally for use with frequencies in the range of a few cycles per second to one or two hundred cycles per second (the seismic frequencies).

If the reference waveform in the form of a printed-circuit track is a sine wave, the correlating apparatus which has been described herein can be used as or adapted to provide a filter having a single peak whose Q is given approximately by the number of cycles in the waveform. This fact means that a multi-channel filter having a Q of several thousand on each channel can be provided in a very inexpensive manner, and this is an important feature and application of the invention. The apparatus can readily furnish 40 channels representing contiguous frequency bands of very narrow bandwidth, and the addition of further channels is very inexpensive.

It has been said that the Q of the filter is represented by the number of cycles of the reference waveform. If, therefore, a value of Q is desired which is less than the maximum provided by the dimensions of the machine, the dimensions may be reduced. If a value of Q less than about 10 is required, the straightforward reduction in the number of cycles of the reference waveform leads to an inadequate voltage output from the printed head. This leads to the concept of a frequency analyser having one or more printed heads of swept-frequency type; this provides an interesting method of filtering which is capable of many applications and which offers a number of advantages over known methods.

According to this application of the invention, the reference waveform of a correlator adapted to operate as a spectrum analyser is a swept-frequency waveform having a particular frequency-time relation. For instance, the frequency may vary in linear proportion to time, or the reciprocal of the frequency may so vary, or there may be some other analytical relation between frequency and time. The two specified above are of particular interest, and will be termed the "linear-frequency" and "linear-wavelength" sweeps, respectively.

Consider first a disc-type machine having 20 tracks and a period of revolution of 0.5 second. Consider that on the innermost track the printed waveform starts at a frequency of 200 c.p.s. and increases to 390 c.p.s. by the end of that track, that on the second track the waveform starts at 390 c.p.s. and increases to 580 c.p.s., and so on; then on the outermost track the waveform starts at 3810 c.p.s. and increases to 4000 c.p.s. Thus, if all the tracks are visualised as being laid end-to-end, the result is a waveform whose frequency increases linearly from 200 to 4000 c.p.s. in 10 seconds. This, then, is the case of the linear-frequency sweep. Each printed waveform is taped at nine equally-spaced points (which may be done by drafting on the original master photograph) to give a total of 200 sections of waveform each representing a bandwidth of rather less than 20 c.p.s. There are, in fact, about 10 cycles of waveform in the lowest section and about 200 cycles in the highest. (These dimensions do not include space for the recording and erase heads, but the manner of allowing for these is obvious from the above.)

Thus, by selection of the section or sections of the waveform which are connected to the playback amplifier, a filter may be provided which has any desired bandwidth, in 20 c.p.s. increments. Clearly, the provision of more taps allows even smaller increments of bandwidth. It should be noted that the filter pass-band resulting from this use of the machine has a flat top and steep sides, and is more desirable than the response obtained with heterodyne-type analysers.

Alternatively, of course, it is possible to provide a playback amplifier for each section of the head, and so to make a simultaneous spectrum analysis in a large number of narrow constant-bandwidth bands. The need for many playback amplifiers (10 per track in the case quoted above) can be removed by fitting a rotating contactor and slip-rings to the shaft 24, and by connecting the sections of waveform to contacting commutator segments arranged around the rotating contactor.

In one relisation of this system, the contacting segments are made by a printed-circuit process on the underside of a board similar to the board 14; connections to the waveform are made through the board by a process known in the art as "plated-through holes," and the whole is plated with a suitable metal to reduce contact problems. In this way one play-back amplifier only is required per track, and the output from this amplifier is a measure of the signal in each of the narrow frequency bands, selected in turn.

A final position on the contactor may connect the entire waveform of one track to the playback amplifier for a fraction of a revolution; in this way a very useful "coarse" and "fine" display may be arranged. Again it should be noted that the "coarse" pass-band has a flat top and steep sides.

Figure 6A:
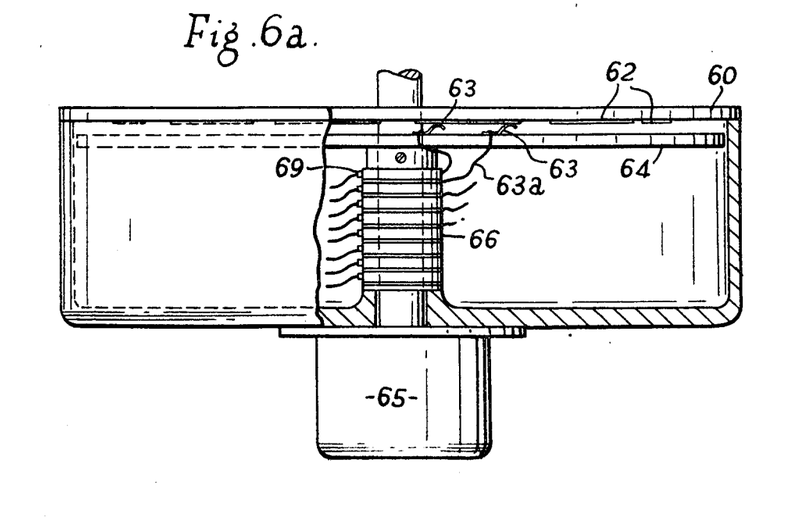
FIG. 6a is a view, partly in vertical section, showing a modified form of apparatus which exemplifies certain further features of the invention.
Figure 6B:
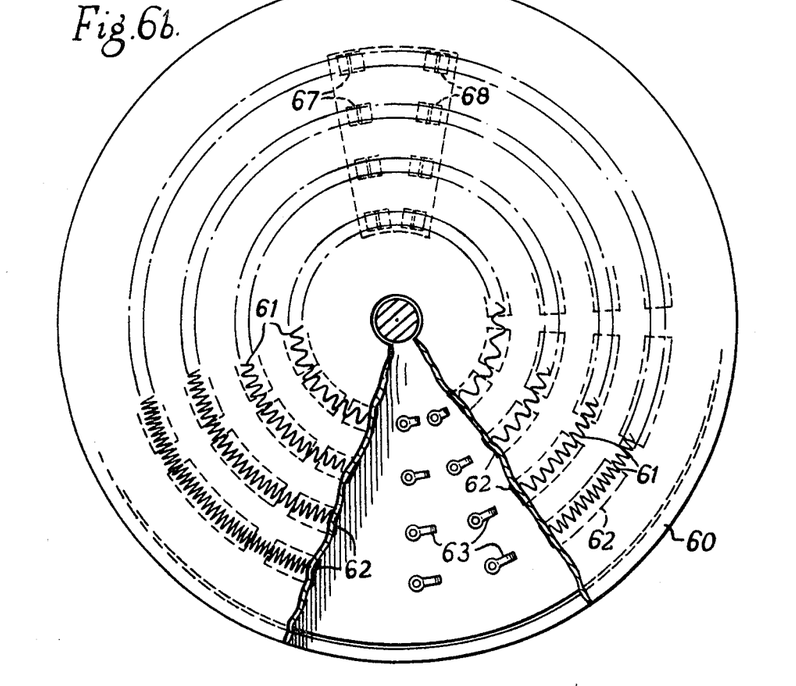

Referring to FIGS. 6a and 6b, the reference 60 shows a board, corresponding to the board 14 of FIGS. 3a and 3b, which carries on its upper surface a series of tracks 61 which are of the constant band-width, swept-frequency type discussed above. These are printed on the board 60 and are tapped through the latter to a series of segments 62 by the "plated-through" method discussed above. These segments 62 are engaged by a series of brushes 63 mounted on an insulating plate 64, which plate is driven by a motor 65, which corresponds to the motor 25 of FIG. 3a and which drives a disc of magnetic material (not shown) corresponding to the disc 20 of FIG. 3a over the playback heads provided by the tracks 61. The apparatus also includes recording and erase heads 67 and 68, respectively, corresponding to the heads 17 and 18 of FIG. 3b.

The brushes 63 are connected by leads, such as 63a, to slip rings 66 which rotate with the disc 64 and which are engaged by brushes 69. These brushes are connected to suitable amplifier (not shown), one for each of the tracks 61.

An extension of the above concept of commutating the several sections of one track can be made, in which the connections from all of the sections of all of the tracks are brought to one printed commutator. Thus, in the case discussed above, there are 200 segments on the static part of the commutator, and a double wiper contact on the rotating part; this wiper thus connects the two ends of each of the 200 sections, in turn, to the input of the playback amplifier. The output of the playback amplifier, displayed as a function of time, then represents a plot of the signal spectrum as a function of frequency, and may be calibrated accordingly.

It should be understood that the figures quoted are for illustration only. Thus the total bandwidth of the waveform, the number of tracks, the disc speed and the number of taps may all be manipulated to give more or less spectral resolution and more or less frequency coverage.

As described, the device is adapted to a "running" spectral analysis, so that the spectral content of a slowly-changing periodic waveform may be studied as a function of time. Various other operating possibilities exist, including particularly the recording of a signal during one revolution of the machine, the disabling of the erase heads, and the sequential study of particular features of the signal on subsequent revolutions. In this latter mode of operation, it is entirely feasible to use a rotational speed during the analysis which is either greater or less than that during the analysis which is either greater or less than that during the recording; the frequency range of the device can thus be extended within wide limits.

It is also possible to reduce the need for commutating contacts and slip rings by using a rotating disc of which only one sector is coated with magnetic oxide, or by connecting the recording heads to their corresponding drive circuits during only a fraction of a revolution. In the first case the bandwidth represented by the system is proportional to the angle of the sector; in the second it is proportional to the angle of revolution during which the drive circuits are connected.

The above discussion of the linear-frequency sweep shows that it is well adapted to analysis of the constant-bandwidth type; in this case the taps are made at points corresponding to equal time increments along the linear-frequency waveform. However, it is possible, if sufficient taps are provided, to arrange the electrical connections to provide any type of bandwidth-frequency relation, including particularly the constant-percentage-bandwidth or fractional-octave relation.

Consider now the case of the linear-wavelength sweep, which is particularly appropriate to the constant-percentage-bandwidth mode of analysis. If a linear-wavelength sweep is used (as before, between 200 and 4000 c.p.s., and having 20 tracks each representing 0.5 second) it is easy to show that the waveform has about 1460 cycles per octave and that a tap every 38 cycles produces 166 pass-bands of constant percentage-bandwidth each approximating to one thirty-eighth of an octave.

Many of the features of the linear-frequency sweep have analogous features in this linear-wavelength case also. Thus, in the example quoted, bandwidths of about one nineteenth of an octave may be obtained by using every second tap, bandwidths of about one-tenth of an octave using every fourth tap, and so on. As before, these pass-bands have flat tops and steep sides; indeed, for one-third-octave filtering with the device as described, the pass-bands approximate very closely to the rectangular characteristic of an "ideal" filter.

As before, also, a different frequency range or a different number of tracks may be used to obtain different spectral resolution. One interesting illustration occurs when a drum-type machine is used as a multi-channel analyser with one track per channel; in this case the range from 200 to 4000 c.p.s. can be analysed into one-ninth octave bands with a tap every 9 cycles, or into steep-sided one-third octave bands with a tap every 27 cycles.

The commutating feature discussed for the linear-frequency sweep may be applied to the linear-wavelength sweep, as may also the technique of changing the speed between the recording and analysing processes.

One point of distinction arises in that the two stages of integration required for general correlation purposes, and for linear-frequency sweep analysis, are not required for linear-wavelength sweep analysis.

It should be noted that both methods of frequency analysis provide frequency-selective action without any phase shift. Different sections of the waveform along any one track obviously represent different time samples, but this may be taken into account in the display of the outputs. In the case of the commutated display, a two-trace recorder can be used to show the input signal on one trace and the corresponding spectrum on the other, with the spectrum ordinate of the second trace displayed opposite the centre of the corresponding time sample of the input signal.

One additional and useful point should be added to the discussion of the application of the correlator to filtering; it is possible by connecting shorting links or resistors between taps to realise any type of band-stop, notch, band-pass or other filtering, of any degree of complexity. If the input signal is periodic, the output or outputs may be displayed directly. If the input signal is not periodic, the output has the frequency content appropriate to the desired filter (represented by the shorting links and/or resistors used) but its actual waveform is not directly significant. To overcome this, the output signal may be fed to a second recording head which is aligned with a second printed-waveform track; this track has the same form as that used first in the correlator, but is reversed in time (so that if the first track is an "upsweep," the second is the complementary "downsweep").

The second track may also be fitted with the shorting links and/or resistors, so that two frequency-selective actions are cascaded. The output from the second track is then a filtered version of the input signal, where the amplitude-frequency characteristic of the filter is determined by the shorting links and/or resistors, and where the entire filtering action is accomplished with zero phase distortion.

The relation between the technique described above and the theory of matched filters will be clear to those skilled in the art. Thus, with the provision of an upsweeping track and a downsweeping track on each channel, it is possible for the machine to operate either as a spectrum analyser or as an extremely flexible, phaseless and entirely novel filter. The extreme flexibility makes the device eminently suitable for inverse filtering or deconvolution studies.

Figure 7:
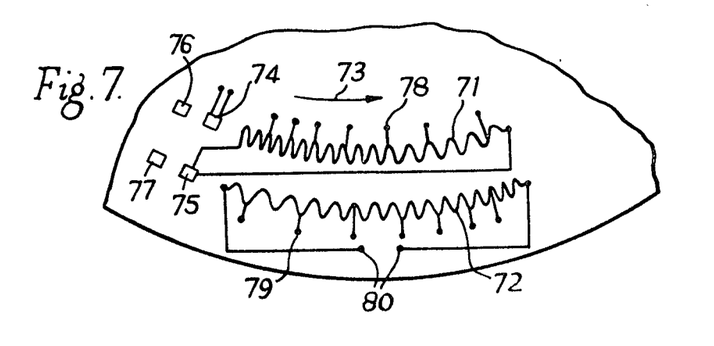
FIG. 7 is a detail view illustrating diagrammatically yet another feature of the invention.

An arrangement on the above lines is illustrated diagrammatically in FIG. 7. This shows two tracks 71 and 72 which are traversed by a suitable recording medium (not shown) which is assumed to be in the form of a disc similar to that shown at 20 in FIGS. 3a and 3b. This is driven over the heads 71 and 72 in the direction of the arrow 73. The references 74 and 75 indicate recording heads, while 76 and 77 are erase heads. These may be similar to the heads 17 and 18.

It will be noted that the heads 71 and 72 are of the swept frequency type, the sweeps being in opposite directions in the two heads, while each of the heads is provided with a series of tappings 78 and 79, respectively, by which sections of the track can be shorted either directly or through resistances connected across the tappings. The short-circuit connections or resistors may, in fact, be printed on the board.

The input signal is applied to the recording head 74, producing a response in the playback head 71. This response is fed to the other recording head 75 and produces at the terminals 80 of the head 72 an output which is fed to a suitable amplifier.

Such apparatus may be used as described above as a spectrum analyser or as a filter.

The third major application of the apparatus and invention is in the automatic recognition of speech.

It is known that human speech, is most languages at least, can be resolved into 40 phonetic units or phonemes; 26 are needed in English, 12 of these being vowel sounds and 14 being common consonants. These sounds are formed by the frequency-selective and damping action of the vocal cavities and the mouth on an input excitation provided by the larynx. This excitation may have a continuous broad-band spectrum, or it may represent a low-frequency "pitch" fundamental, combined with a great number of harmonics; in either case the excitation is modified by the process of transmission through the vocal cavities, and it is the nature of the modifications (rather than the excitation) which conveys the information in speech.

The vowel sounds usually involve a spectrum having one, two or three marked peaks (the "format" frequencies) and a duration in the range 70 to 400 milliseconds. The duration of the consonants is generally less. Recognition of phonemes by man probably involves their spectral distribution, their duration and the change of spectrum as a function of time.

Devices exist in the prior art for the recognition of speech. In these the complex sound is applied to a bank of band-pass filters and a measurement is made of the signal power at the output of each filter. Thus a certain vowel is indicated if appreciable output is obtained simultaneously from filters peaked on particular formant frequencies. These devices make no use of the actual waveform of the speech sounds, but only of their spectra; this is justified by the fact that the waveform itself varies with the excitation, so that two sounds which are recognised as being identical need not have the same waveform.

The present invention may be applied to the recognition of speech. When doing this it is found that the principle of operation must be modified according to the phoneme, and that three broad classes of operation are involved.

The first class of operation, suited particularly to some consonants, is a direct cross-correlation of the incoming speech against a master waveform of the phoneme. Thus some consonants are adequately recognised by their waveforms. Such recognition can be accomplished by printed waveforms of the kind which have been described above; the output then varies with the particular consonant, but is in some cases a fairly sharp pulse train. As discussed above, recognition is possible against a higher noise background if the waveform duration is large (up to the maximum value normally encountered in speech), but there is a greater tolerance of stress, pitch and speaker-to-speaker variations if the waveform duration is abbreviated. The duration which is finally adopted for each phoneme will, therefore, be a compromise.

The second class of operation, suited to other consonants and some vowels, is also a direct cross-correlation of the incoming speech against a master waveform of the phoneme. In this case, however, the identification is not achieved primarily by the recognition of the waveform; advantage is taken of the fact that the cross-correlation process forms a filter which has appreciable response only to those frequencies contained in the reference waveform. Thus there is a systematic tendency for a phoneme which has the correct spectrum for a particular printed waveform to produce more output than would be given by any other phoneme of the same variance. It is important, however, that the reference waveform should not be of duration comparable to the entire phoneme. For those phonemes which are characterised by changes of spectrum during the phoneme, several short samples of the waveform may be used, distributed in approximately their correct time positions. The output in this case is not usually a short pulse well defined in time, but it is, nevertheless, sufficient to operate suitable discriminators.

The third class of operation is merely the equivalent of that of a conventional recognition device, except that the conventional LC filters are replaced by the printed-waveform filters described above in connection with spectrum-analysis applications. This class of operation is particularly appropriate to some vowels. A sucession of contiguous band-pass filters is realised by a set of sinusoidal and/or swept-frequency waveforms; the outputs from these several waveforms (after preamplification) are distributed by resistive networks so that the presence of a particular combination of format frequencies produces a large signal in the network termination associated with the appropriate vowel.

Thus, the whole process of phoneme recognition can be accomplished by means of a printed-circuit board carrying 40 or more waveforms. Some of these waveforms may be actual speech waveforms typical of particular phonemes, others are abbreviated or manipulated versions of actual phoneme waveforms, and others are quasi-sinusodial waveforms acting as spectrum analysers. Some phonemes may have two or more slightly different waveforms, so that greater speaker-to-speaker variations may be tolerated. A similar provision allows for the case where the characteristics of a phoneme vary with the phonetic context. If necessary, the entire range of waveforms may be reproduced at several time scales, so that changes in the rate or speaking may be more widely tolerated. It is stressed that the active elements of the present device—the printed waveforms—are both rugged and inexpensive, and it is entirely feasible, in particular applications, for a speaker to have his own printed-waveform board.

The master waveforms for the printed heads may be made by any of the methods described above. The basic phoneme waveform may be enunciated separately, or the speaker may voice a test piece, from which individual phonemes are selected by a skilled editor. The second technique is particularly desirable when several heads are being used for one phoneme, as has been described.

We have said that the ouutput from the printed waveforms depends on the phoneme; in some cases it is a fairly sharp pulse train in others the output shows a more gradual rise to a maximum, and then a gradual decay. The phonemes which are recognized by the spectral-analysis method also show a gradual rise and decay. In any event, a large output from a particular head (or in the spectral-analysis case, a particular resistor network) represents recognition of the corresponding phoneme; this output, after suitable amplitude discrimination, may be used to operate a typewriter, coder, or other device.

The electrical output from the printed heads or the resistor network may be subjected to several operations to improve the certainty of the phoneme identification. The first of these may be an amplitude discrimination, which suppresses all signals below a certain threshold; this threshold may be set appropriate to the duration and bandwidth of the phoneme. The second may be a process of rectification and smoothing, where the time constant of the smoothing circuit is chosen appropriate to the duration and gliding nature of the phoneme. The third may be a further amplitude discrimination, which ensures that the final "phoneme identified" output signal is triggered only when the output from the smoothing circuit rises above a set level. Since most phonemes occupy considerably less than the maximum waveform duration provided by the apparatus as described, the positions of the active part of the printed heads must be decided with due regard to the smoothing time constants and final triggering level; this ensures that a brief consonant following a long vowel cannot "overtake" it in the machine.

So far, the apparatus described functions equally well for any language. When the apparatus is to be employed with one language only, a knowledge of the language can be built into the machine. This can be illustrated by reference to a case discussed above, where one vowel may vary in structure according to the type of consonant which follows it; it has already been said that several heads may be provided for one such vowel. If, however, some part of the output from the first of these several heads is fed to the smoothing circuits associated with each consonant in the first group of consonants, and if similarly the second and third heads give an initial bias to the second and third groups of consonants, the machine will have a disposition to make a correct consonant identification.

The above principle can be extended so that proportions of the output from any or all phonemes can be fed into the circuits of the others in proportion to the statistical probabilities that one particular phoneme will be followed by another particular one. This information, of course, is a function of the language. It is important to note that the machine can be taught a new language merely by changing the resistors which govern the predisposing crossfeed, and that these may conveniently be arranged on a plug-in mounting.

The apparatus typically has 40 output connections, and the presence of a pulse on one of these outputs indicates that the corresponding phoneme has been identified. Such pulses may be used, for example, to operate the keys of an electric typewriter fitted with phonetic symbols, or they may be used as the input to a language-translating computer whose memory is written in phonetic symbols, or they may be encoded according to a code designed to minimize the bandwidth necessary for the transmission of the phonetic information.

Alternatively, the output pulses may be encoded according to a different code, and the coded signals may then be used as the input to a second cross-correlating machine. This second machine is then capable of recognizing a considerable repertoire of commands and sentences, by acting on the succession of coded signals in exactly the manner used by the first machine to recognize the phonemes. Thus the encoded versions of the many commands are stored as printed playback heads, while the succession of coded signals from the first machine are applied to the record heads. Appropriate changes of drum speed and scale are required, and these allow the mounting of more than 40 heads in a machine of the same size. Accordingly several heads, at different time scales, may be provided for each command; thus recognition of a command can be maintained over a range of speaking rates.

The fourth major application of the present invention is for the snythesis of speech. This is of importance because the narrow-bandwidth advantage of coded phoneme transmission (for instance, over a submarine telephone cable or a satellite communications link) becomes still greater if the coded information can be restored to normal speed at the other end.

It has been noted above that a speech sound does not necessarily define a waveform; however, a speech waveform does define a sound. Therefore a speech waveform derived from a printed head will have the characteristics of normal speech. A method of doing this will now be described with reference to the drum-type correlator; its adaptation to the disc-type machine will be evident to those skilled in the art.

The tape sheet and the mechanical drive system are reversed, to obtain reverse rotation of the drum. The erase heads are maintained as such, but the record heads are now used as conventional playback heads. A new board of printed heads is fitted, appropriate to the reverse rotation. This synthesising board has the same waveforms as the recognizing board, but the waveforms are all turned end-for-end and located with reference to the other end of the board. Each coded phoneme from the first machine is used to trigger a large pulse of current through the appropriate printed head of the second machine; this lays down on the tape a pattern of magnetisation which develops in the conventional playback head a voltage whose variation with time (after suitable equalisation) duplicates the original speech signal from which the printed head was made. Further, if the positioning of the printed heads, the smoothing time constants and the levels of amplitude discrimination are judiciously chosen, the resulting synthesised speech sounds natural and continuous.

The equalisation referred to above differs from that required in the device when used as a correlator, the ideal here being a 6 db/octave high-frequency cut without any phase shift.

Because of the power of the cross-correlation system to distinguish a wanted signal from random noise, the speech-identifying apparatus which has been described can function against a fairly high level of background noise. On the other hand, the speech synthesized by the restoring machine from the output pulses of the identifying machine is quiet free from background noise. This system therefore represents a method of improving speech intelligibility under conditions of high background noise.

In the above description no details have been given of the apparatus which may be used for electronic amplification, rectification, integration, discrimination and triggering, nor of the details of mechanical geared drives, for these are well known in the art.

The present invention is not intended to be restricted to the apparatus which has been particularly described, which merely represents certain preferred features and embodiments of the invention. The invention is intended to include within its scope means for the cross-correlation of other time-variables, particularly in the audio-frequency range. One such variable (the signal on the tape in the apparatus (described) can take the form of a spatial distribution of some physical property, and the other (the printed head in the apparatus described) can take the form of a matched spatial distribution of detecting means sensitive to that physical property. Other methods of recording fall within the scope of the invention, and electrostatic recording is mentioned as a suitable example.

Certain other modifications also fall within the scope of the invention. For example, a printed head may, in suitable cases, be replaced by a wire-wound head, which may be constructed as described in our aforesaid applications. This provides a method of extending the frequency range well beyond audio frequencies.

Figure 8:
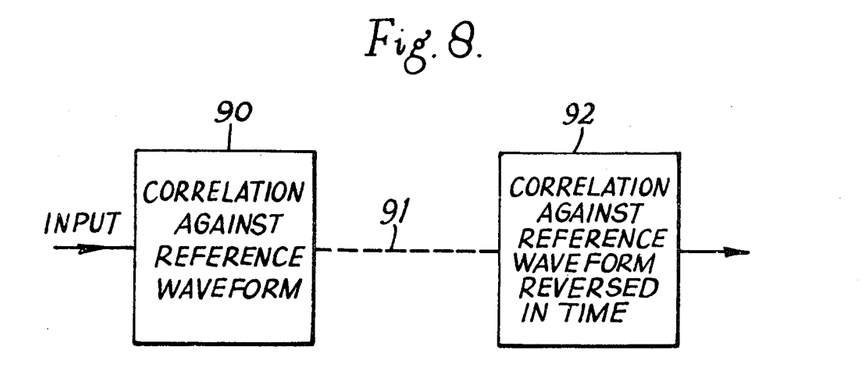
FIG. 8 is a view diagrammatically illustrating another embodiment of the invention.

Reference has been made above to the application of the invention to communications. One method of doing this which offers a number of advantages is illustrated diagrammatically in FIG. 8 and comprises the use of a correlating device 90 of the type described above for cross-correlating the signal to be transmitted against a reference waveform having an amplitude spectrum which is at least as wide as is necessary to provide the required signal intelligibility and having an arbitrary phase function, next transmitting the resulting signal along a communication link indicated schematically by the broken line 91 in FIG. 8, for example by radio or along a transmission line, and then using a correlating device 92 of the type described above for cross-correlating the received signal against a reference waveform which is the time inverse of the first reference waveform; in other words the two reference waveforms are of the same form but are reversed in time.

We claim:

1. Apparatus for correlating first and second variables the first of which is represented by variations in an electrical signal, wherein the apparatus comprises a plurality of recording heads, at least one playback head associated with each recording head to form a pair, one of said heads of each pair including a plurality of conducting elements which are distributed along part of an enclosed circular path and represent a function of the second variable, means for passing a recording medium around the said enclosed circular path such that variations in the said signal which is supplied to the recording head produce an output from the associated playback head which represents a correlation of the said variables, erase means provided between the respective heads of each pair for erasing signals previously recorded on the medium before the latter reaches the recording head, the respective recording and playback heads being arranged to record on and to play back from parallel tracks on the recording medium, the heads being so arranged and connected that when the signal representing the first variable is fed to a first recording head the correlated output which is obtained from the first playback head is fed to a second recording head and is then correlated with the same second variable but with the latter reversed in time.

2. Apparatus according to claim 1 wherein the conducting elements form parts of conducting traces of stepped frequency sinusoidal or swept frequency quasi-sinusoidal form.

3. Apparatus for recording at least two variables one of which is represented by variations in an electrical signal, wherein the apparatus comprises at least one recording head, at least one playback head, one of said heads including a plurality of conducting elements which are distributed along part of a closed circular path and represent a function of the other variable, means for passing a recording medium around the said closed circular path such that variations in the said signal which is supplied to the recording head produce an output from the playback head which represents a correlation of the said variables, erase means provided between the respective heads for erasing signals previously recorded on the medium before the latter reaches the recording head, the conducting elements being formed by parts of a conducting trace of stepped frequency sinusoidal or swept frequency quasi-sinusoidal form, the said trace including a plurality of spaced tappings distributed along it such that the effectiveness of a selected section or sections of the trace corresponding to a selected frequency or frequencies can be modified to effect filtering or spectrum analysis, the tappings being connected to a rotating commutator which is driven in synchronism with the recording medium.

4. Apparatus for correlating a variable represented by variations in an electrical signal with a plurality of other variables, wherein the apparatus comprises recording means for recording said signal on a recording medium, a plurality of electrically disconnected playback heads oriented side by side, each of said playback heads including a plurality of conducting elements which are distributed along part of a closed circular path and represent a function of one of said other variables, and means for passing said recording medium around all of said closed circular paths such that variations in the said signal produce an output from each playback head which represents a correlation of the variables, and erase means for erasing signals previously recorded on the medium.

5. Apparatus according to claim 4, wherein the recording medium is in the form of a loop of material in sheet form, the playback heads being formed around a cylinder located outwardly from said loop, the loop being pressed against said playback heads by centrifugal force while the loop is rotated by said passing means.

6. Apparatus for correlating a number of variables at least one of which is represented by variations in an electrical signal, wherein the apparatus comprises a plurality of sets of heads each of which sets includes a magnetic recording head and a playback head, the recording or the playback heads being electrically isolated from each other and each being respectively formed by electrically conducting traces oriented side by side and carried by a support of cylindrical internal form, a drum mounted within the support concentrically therewith, means for driving the drum and means for attaching a sheet of magnetic recording material to the drum so as at least partly to surround the latter, the recording material being adapted to be held against the heads during rotation of the drum and erase means being provided between each recording head and its associated playback head.

7. Apparatus for recording at least two variables one of which is represented by variations in an electrical signal, wherein the apparatus comprises at least one recording head, at least one playback head, one of said heads including a plurality of conducting elements which are distributed along part of a closed circular path and represent a function of the other variable, means for passing a recording medium around the said closed circular path such that variations in the said signal which is supplied to the recording head produce an output from the playback head which represents a correlation of the said variables, the conducting elements being formed by parts of a conducting trace, said trace including a plurality of spaced tappings distributed therealong such that the effectiveness of a selected section or sections of the trace corresponding to a selected frequency or frequencies can be modified to effect filtering or spectrum analysis, and means connecting the tappings to a rotating commutator driven in synchronism with the recording medium.

8. Apparatus for recording at least two variables one of which is represented by variations in an electrical signal, wherein the apparatus comprises at least one magnetic recording head, at least one magnetic playback head, one of said heads including a plurality of conducting elements which are distributed along part of a closed circular path and represent a function of the other variable, means for passing a recording medium in the form of a disc around the said closed circular path such that variations in the said signal which is supplied to the recording head produce an output from the playback head which represents a correlation of the said variables, support means for said playback head adjacent said disc, and means for producing a difference in air pressure on opposite faces of the disc for forcing the disc against the adjacent support means.

9. Apparatus for recording at least two variables one of which is represented by variations in an electrical signal, wherein the apparatus comprises at least one recording head, at least one playback head, one of said heads including a plurality of conducting elements which are distributed along part of a closed circular path and represent a function of the other variable, means for passing a recording medium around the said closed circular path such that variations in the said signal which is supplied to the recording head produce an output from the playback head which represents a correlation of the said variables, the conducting elements being formed by parts of a conducting trace of stepped frequency sinusoidal or swept frequency quasi-sinusoidal form, the said trace including a plurality of spaced tappings dividing the trace into selected frequency sections each representing a predetermined frequency band, a signal utilizing device having an input connected to said tappings, and means for selectively connecting different ones of said tappings to said input to select different frequency bands.

10. An apparatus for correlating variables, said appartus comprising an extended transducer having a sensitivity pattern varying with distance as a function of a property of one of the variables, a medium coupled to said transducer and extending therealong, means for relatively moving said medium and said transducer, means for applying a predetermined signal to said extended transducer to produce an energy field in said medium which varies as a function of the sensitivity pattern of the transducer, and another transducer coupled to said medium and acted upon by said energy field.

11. The apparatus defined by claim 10 wherein the medium is a magnetic recording medium, said signal comprising a pulse which is applied to the extended transducer to produce a pattern of magnetization on said medium corresponding to the sensitivity pattern of the transducer.

12. The apparatus defined by claim 11 wherein the extended transducer comprises a continuous conductor shaped to provide said sensitivity pattern.

13. A method of communication which comprises:
generating at a first location the cross-correlation signal $h(t)$ of a signal to be transmitted $f(t)$ with a reference waveform $g(p)$ having a spectrum amplitude which is at least wide enough for intelligibility, where $$h(t) = \int_0^T f(t-p)g(p)dp$$

transmitting the signal $h(t)$ along a communications link to a second location remote from said first location; and
generating at the second location a cross-correlation signal $f'(t)$, where $$f'(t) = \int_0^T h(t-p)g(T-p)dp$$

14. An apparatus for use in filtering or spectrum analysis of a waveform comprising:
a first correlator comprising:
a transducer having a pattern of transducer sensitivity as a function of distance which pattern represents a reference waveform shaped to give the desired filtering characteristic,
a recording medium bearing an input waveform which is to be filtered, and
means for relatively moving the recording medium over the transducer so as to develop within the transducer a first cross-correlation signal;
a second correlator comprising:
a transducer having a pattern of transducer sensitivity as a function of distance which pattern represents a reference waveform identical in shape to that used in the first correlator but reversed in direction with respect to the waveform on the recording medium,
a recording medium bearing a waveform whose shape as a function of distance matches the shape of the first cross-correlation signal as a function of time, and
means for relatively moving the recording medium over the transducer so as to develop within the transducer a second cross-correlation signal that is a filtered version of the input waveform.

References Cited

UNITED STATES PATENTS

| | | | |
|---|---|---|---|
| 1,645,618 | 10/1927 | Nyquist | 324—57 X |
| 2,638,402 | 5/1953 | Lee. | |
| 2,820,173 | 1/1958 | Raabe. | |
| 2,864,072 | 12/1958 | Blake. | |
| 2,866,899 | 12/1958 | Busignies et al. | |
| 3,033,461 | 5/1962 | Passu | 235—181 |
| 3,052,843 | 9/1962 | Hurvitz | 324—77 |
| 3,061,813 | 10/1962 | Geyer. | |
| 3,076,176 | 1/1963 | Lawrence | 340—15.5 |
| 3,174,142 | 3/1965 | Mallinckrodt | 340—149 X |
| 3,199,106 | 8/1965 | Karr. | |
| 3,209,317 | 9/1965 | Webster | 324—77 XR |

EDWARD E. KUBASIEWICZ, Primary Examiner

U.S. Cl. X.R.

179—15.55; 235—181; 340—174.1; 343—7.6